United States Patent
Shaked et al.

(10) Patent No.: US 6,763,121 B1
(45) Date of Patent: Jul. 13, 2004

(54) HALFTONE WATERMARKING METHOD AND SYSTEM

(75) Inventors: Doron Shaked, Haifa (IL); Izhak Baharav, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 09/594,211

(22) Filed: Jun. 14, 2000

(51) Int. Cl.[7] .................................................. G06K 9/00
(52) U.S. Cl. ....................................... 382/100; 382/237
(58) Field of Search ................................. 382/100, 237, 382/232; 283/72; 358/3.03, 3.05, 3.06; 380/210, 243, 252, 287

(56) References Cited

U.S. PATENT DOCUMENTS

| | | | | |
|---|---|---|---|---|
| 5,315,098 A | * | 5/1994 | Tow | 235/494 |
| 5,446,857 A | * | 8/1995 | Russ | 711/100 |
| 5,692,109 A | * | 11/1997 | Shu | 358/1.9 |
| 5,889,868 A | * | 3/1999 | Moskowitz et al. | 713/176 |
| 6,000,613 A | * | 12/1999 | Hecht et al. | 235/456 |
| 6,526,155 B1 | * | 2/2003 | Wang et al. | 382/100 |
| 6,690,811 B2 | * | 2/2004 | Au et al. | 382/100 |
| 6,694,041 B1 | * | 2/2004 | Brunk | 382/100 |

OTHER PUBLICATIONS

Fu et al. "Data Hiding for Halftone Images", Proceedings of SPIE–Security and Watermarking of Multimedia Contents II, Jan. 24–26, 2000.*

* cited by examiner

Primary Examiner—Leo Boudreau
Assistant Examiner—Ryan J. Miller (57) ABSTRACT

The watermark system and method. The watermark system includes a watermarking module for generating a half-tone image with a watermark (a watermarked halftone image) and a watermark recovery module for receiving a scanned image of a hard copy of the watermarked halftone image and recovering a watermark that is embedded in or specified by the scanned image. A print engine can be provided to receive the watermarked halftone image and generate a hard copy of the watermarked half-tone image. A scanner can be provided to scan a hard copy of a watermarked half-tone image and to generate a scanned image that can be provided to the watermark recovery module.

13 Claims, 10 Drawing Sheets

| ERROR DIFFUSION: NO WATERMARK | PRE-DETERMINED LOCATIONS | NAIVE WATERMARK | POST-THRESHOLD WATERMARK | PRE-THRESHOLD WATERMARK |
| --- | --- | --- | --- | --- |
| FIG. 9A | FIG. 9B | FIG. 9C | FIG. 9D | FIG. 9E |

FIG. 10

LOOK FOR LOCATIONS FOR WHICH $d_{ij}$ IS SMALL → LOCATIONS WHERE B/W IN THE HALFTONE ARE BOTH REASONABLE

? - IS PROBABLY W

FIG. 11A

LOOK FOR LOCATIONS FOR WHICH $d_{ij}$ IS SMALL → LOCATIONS WHERE B/W IN THE HALFTONE ARE BOTH REASONABLE

? - EITHER B OR W

HALFTONE WATERMARKING METHOD AND SYSTEM

BACKGROUND OF THE INVENTION

1. Field of the Invention

The present invention relates generally to systems and methods for half-toning images, and more particularly, to a method and system for watermarking images during the halftone process.

2. Description of the Prior Art

Watermarking of digital images is a process in which information is added to or embedded in the digital images. The embedded information should be robust to non-destructive image processing procedures, and the embedding process should not adversely affect the quality of the digital image. In other words, a good digital watermark cannot be removed from the image without significantly degrading the image, and should not be easily noticeable.

In conventional watermarking processes, the watermarking is accomplished by taking a digital image, such as a continuous-tone image that is suitable for display, and adding the watermark to obtain a watermarked continuous-tone image. The watermark can be added by performing a mathematical transform operation (e.g., a Fourier Transform operation) on the continuous-tone image, adding a watermark to the transformed image, and then performing an inverse transform operation to obtain the watermarked continuous-tone image. This conventional watermarking process can be utilized to unauthorized digital copies of an image. For example, if a digital image having a watermark therein is found uploaded on an Internet Web page, but it is determined that the image is not authorized (i.e., the owner of the image has not granted permission to the Web site operator to post the image), appropriate steps can be taken to remedy the situation.

Unfortunately, the prior art watermarking techniques have generally been limited to digital images and have not been extended to hard copy images, especially those images that have been rendered by a halftone process.

As the print quality of printers that employ a halftone process increases, there is an increasing threat that these printers be utilized in illegal or fraudulent operations. For example, one such operation is the printing of counterfeit currency and other counterfeit prints (e.g., hard copies of copyrighted artwork and images) by using these half-tone printers. As can be appreciated, there are numerous applications where it would be desirable to be able to use an offending print or fraudulent print (e.g., a document that violates the copyrights of a third party or counterfeit currency) to uniquely identify the source that generated the print.

Unfortunately, the prior art methods of watermarking cannot be used to identify a printer from which a particular print is printed since the prior art watermarking is performed independent of and separate from the half-toning process.

It is noted that adding a watermark into the halftone process is not a simple, straightforward, or trivial task. For example, if one simply attempted to print using a half-tone process a digital image, which is watermarked in the process described above, several serious problems would occur. First, the watermark generated by prior art approaches is not robust to printing and scanning. In fact, when a digital image that has a watermark embedded therein by a prior art watermarking process is half-toned, the halftone process injects severe noise to the watermarked image. This noise increases the likelihood that the watermark cannot be recovered accurately. Second, there is also the noise due to the printing and scanner process that is problematic for the watermark generated by the prior art.

Accordingly, there still remains a need for a technique for watermarking images during the half-tone process that overcomes the disadvantages set forth above.

SUMMARY OF THE DISCLOSURE

According to one embodiment of the present invention, a method for embedding a watermark during the half-tone process, generating a hard copy of the watermarked half-tone image, receiving a scanned image of the hard copy, and recovering the watermark from the scanned image. Adding or encoding the watermark includes receiving a continuous tone image, receiving the watermark information to be embedded, and receiving the locations in the image where the watermark is to be imposed or the location determination criteria. Based on these inputs, a watermarked half-tone image is generated during the half-tone process. Recovery of the watermark (or decoding the watermark) involves scanning a hard copy that includes a half-tone image with a watermark. Next, the watermark locations of the watermark or the watermark location determination criteria are received. Based on these inputs, the watermark is recovered.

In another embodiment of the present invention a watermarking system is provided. The watermarking system includes a watermarking module including a first input for receiving a continuous half-tone image, a second input for receiving watermark information, and a third input for receiving watermark locations. The watermarking module generates a watermarked half-tone image that has the watermark imposed at the watermark locations in the half-tone image. The watermarking system can also include a print engine for receiving the watermarked half-tone image and based thereon for generating a hard copy of that image.

The watermarking system also includes a watermark recovery module that has a first input for receiving a scanned image, which can be provided by a scanner, and a second input for receiving watermark locations. The watermark recovery module recovers the watermark from the scanned image.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known circuits and components are omitted so as not to obscure the description of the present invention with unnecessary detail.

Digital images are typically provided in the form of continuous-tone images that are processed by a half-toning process to create half-toned images. Digital half-toning refers to any process that creates the illusion of continuous-tone images by judicious arrangement of the binary picture elements, such as ink drops in the case of ink-jet printers. Thus, half-toning is printing the simulation of a continuous-tone image, such as a shaded drawing or photograph, with groups or cells of color or black dots. The dots are placed in such a way that they appear to the human eye to be a single color. There are many half-toning techniques, each with its own method for laying down dots. There are two primary half-tone techniques: (1) dither half-toning, and (2) error diffusion half-toning.

The present invention provides a method of watermarking an input image (e.g., a digital continuous-tone image) during the half-toning process. The present invention can be implemented in a dither half-toning process or an error diffusion half-toning process. In a preferred embodiment, the watermarking technique of the present invention is implemented in an error diffusion half-toning process as shall be described in greater detail hereinafter. In one embodiment, the watermark is added at predetermined watermark locations of the digital image. In another embodiment, the watermark is added at image content dependent locations (i.e., locations that are determined during the halftone process and that are dependent on the previously rendered pixel values or image content) of the digital image. In this regard, the present invention can incorporate predictors/estimators to better predict watermark locations that minimize distortion to the resulting watermarked half-toned image.

Watermark System 10

Figure 1:
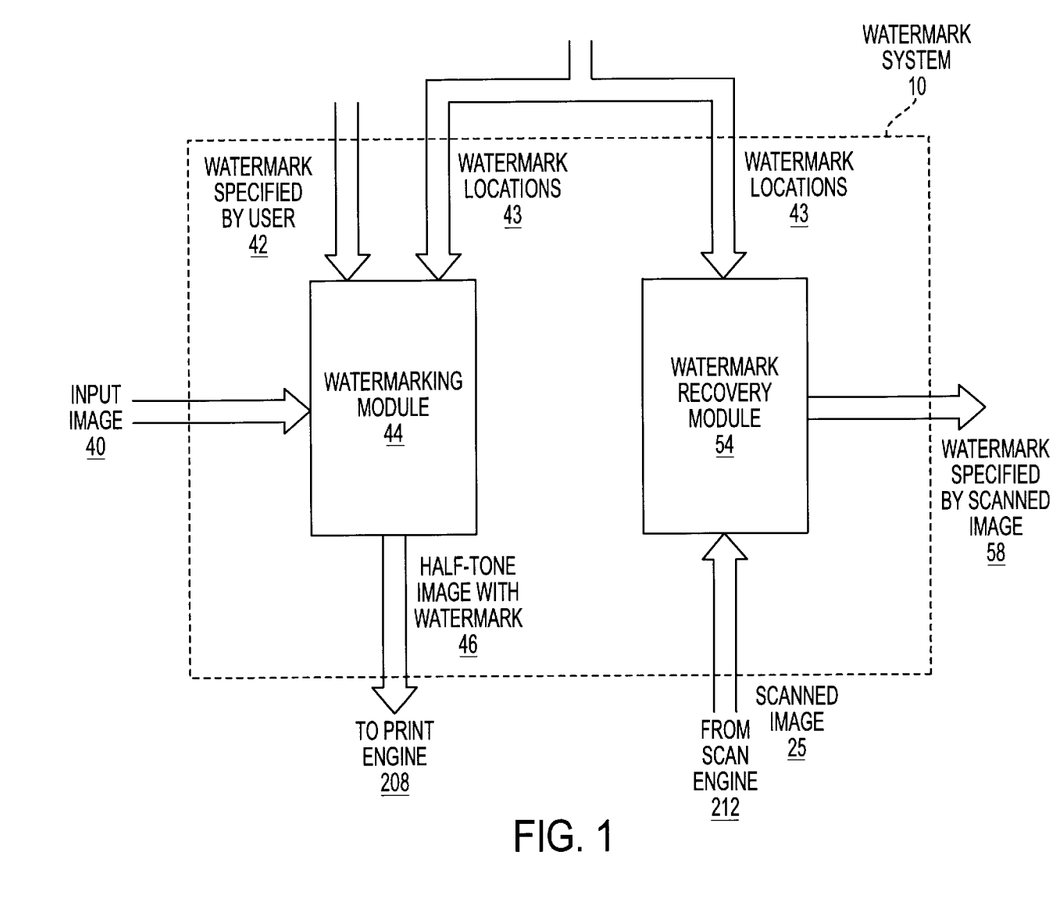
FIG. 1 is a block diagram of a watermarking system configured in accordance with one embodiment of the present invention.

FIG. 1 is a block diagram of a watermark system 10 that is configured in accordance with one embodiment of the present invention. The watermark system 10 includes a watermarking module 44 for generating a half-tone image 46 with a watermark (referred to herein as a "watermarked halftone image") and a watermark recovery module (WRM) 54 for receiving a scanned image 25 and recovering a watermark 58 that is embedded in or specified by the scanned image 25.

The watermarking module 44 embeds a watermark 42 during a half-toning process to generate the watermarked halftone image 46. The watermarked halftone image 46 is then provided to a print engine, which is described in greater detail hereinafter, so that the watermarked halftone image 46 can be rendered on a hard copy 48.

The watermark may be a string of ones and zeros that is specified by the user. Preferably, the watermark is a data string (e.g., a serial number) that uniquely identifies either the rendering process or the rendering device (e.g., the printer that rendered the image). The watermarking process involves imposing data values specified by the watermark 42 at predetermined watermark locations 43 (or as described hereinafter, at locations based on location determination criteria) in the half-tone image.

The watermark recovery module 54 recovers the watermark 58 specified by a scanned image 25. The watermark recovery module 54 receives the scanned image 25 (e.g., a digital image) with a watermark from a source, such as a scan engine of a scanner, which is described in greater detail hereinafter. For example, the scanned image 25 may be a scan of a hard copy 52 of a watermarked halftone image. The watermark recovery module 54 then checks the locations in the scanned image 25 that are specified by the watermark locations 43 in order to recover the watermark 58 that is specified by the scanned image. As described previously, the recovered watermark 58 may be utilized to identify the rendering process or rendering device (e.g., printer) that printed the hard copy image from which the scanned image 25 was obtained.

Exemplary Implementations of the Watermark System 10

The watermark system 10 can be embodied on a media that is incorporated in office equipment (e.g., printer or computer) or separate from office equipment. When incorporated in office equipment, the media, having the watermark system 10 embodied therein, can be in the form of a memory (e.g., random access memory (RAM), read only memory (ROM), etc.). When incorporated separate from the office equipment, the media, having the watermark system 10 embodied therein, can be in the form of a computer-readable medium, such as a floppy disk, compact disc (CD), etc.

The watermark system 10 can be implemented in a variety of ways and in a variety of components that are commonly found in a typical computer system. FIGS. 2(a)–2(d) illustrate block diagrams of exemplary computer systems in which the watermark system 10 of the present invention can be implemented. For example, referring to FIG. 2(a), the watermarking module 44 and the watermark recovery module 54 may both reside in a memory of a personal computer (PC) 200. The PC 200 may be coupled to an all-in-one machine 204 (e.g. a multi-function office machine) as shown. For example, the all-in-one office machine 204 can be an integrated scanner, printer, and facsimile machine that utilizes a half-tone process to render images. The all-in-one machine 204 includes a print engine 208 for rendering an image by utilizing a half-tone process and a scan engine 212 for scanning documents and generating a digital version of these documents. The operation and construction of the print engine 208 and the scan engine 212 are generally well known to those of ordinary skill in the art and will not be described herein. It is noted that the print engine 208 can be any rendering engine that renders an image by utilizing a half-tone process.

Figure 2A:
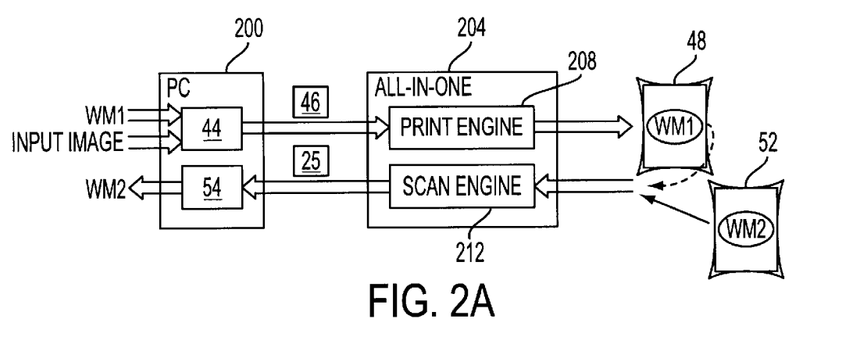
FIGS. 2(a)–2(d) illustrate different computer system configurations in which the watermarking system of FIG. 1 can be implemented.

The watermarking module 44 and the watermark recovery module 54 can both be part of a driver program associated with the all-in-one machine 204 or another program or application residing in the memory.

As illustrated, the watermarking module 44 can embed a first watermark (WM1) and provide the half-tone image with the watermark to the print engine 208 that subsequently generates a hard copy of the watermarked half-toned image 46 with the first watermark (WM1). Similarly, the scan engine 212 scans a hard copy (e.g., hard copy 52 having a second watermark (WM2), and provides the scanned image to the watermark recovery module 54. The watermark recovery module 54 receives the scanned image 25 and recovers the second mark (WM2) from a scanned image 25. Alternatively, if hard copy 48 with the first watermark (WM1) is scanned by the scan engine 212, then the watermark recovery module 54 recovers the second mark (WM2) from the scanned image 25.

Figure 2B:
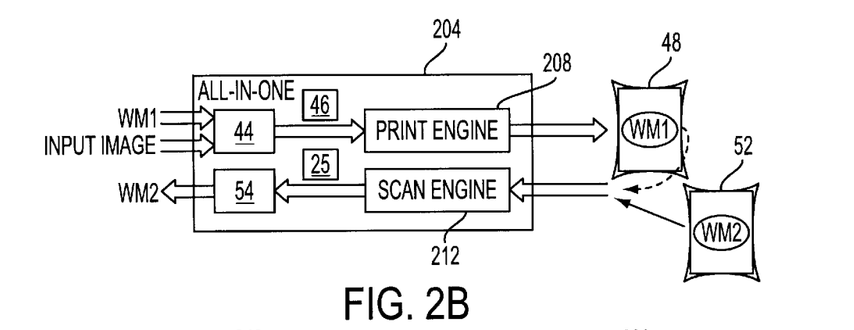

Alternatively, the watermarking module 44 and the watermark recovery module 54 may be embodied in the all-in-one machine 204 as illustrated in FIG. 2(b). In this embodiment, it is preferable for the watermarking module 44 and the watermark recovery module 54 to reside in a memory (e.g., a read only memory (ROM)) in the all-in-one machine and be accessible to the print engine 208 and the scan engine 212. The watermarking module 44 and the watermark recovery module 54 may executed by a dedicated processor in the form of an application specific integrated circuit (ASIC) in the all-in-one machine 204.

Figure 2C:
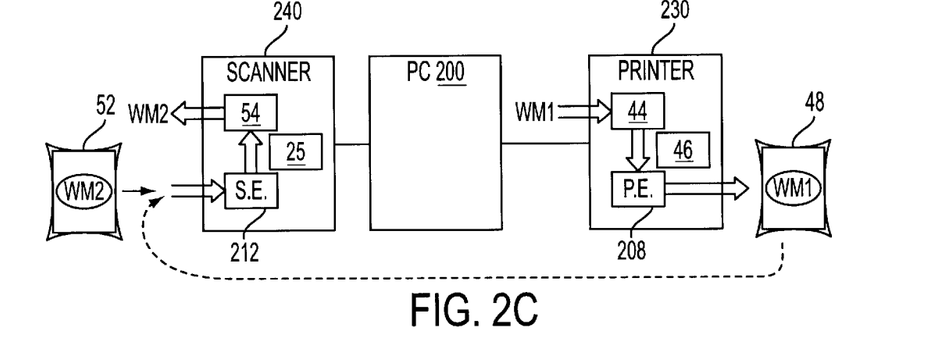

Alternatively, the watermarking module 44 can be embodied in a rendering device 230, such as a printer, and the watermark recovery module 54 may be embodied in a scanner 240 as illustrated in FIG. 2(c). In this embodiment, a printer 230 and a scanner 240 is coupled to a PC 200. The printer 230 includes a print engine 208 for rendering half-tone images and the watermarking module 44 for generating the watermarked halftone image 46. The rendering device 230 can be any device that utilizes a half-tone process to generate a hard copy 48. For example, the rendering device 230 can include, but is not limited to a printer and a digital copier that prints by utilizing a half-tone process. The scanner 240 includes a scan engine 212 for scanning an image 25 with a second watermark (WM2) and providing this image 25 to the watermark recovery module 54. In turn, the watermark recovery module 54 recovers the second watermark (WM2).

Figure 2D:
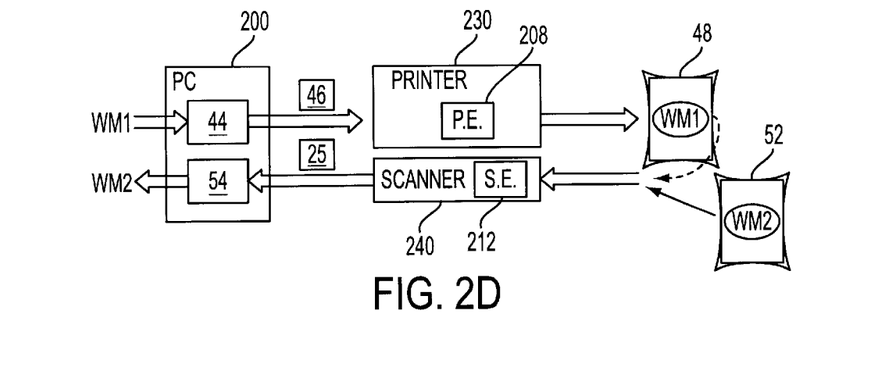

Alternatively, the watermarking module 44 and the watermark recovery module 54 may be embodied in the PC 200 as illustrated in FIG. 2(d). The watermarking module 44 and the watermark recovery module 54 can reside in any application or program in memory. However, it is preferable for the watermarking module 44 and the watermark recovery module 54 to reside in a printer driver and scanner driver, respectively.

It is noted that these examples are not limiting and other combinations are possible. For example, the watermarking module 44 and the watermark recovery module 54 may be embodied in part in the PC 200 and in part in the all-in-one machine 204, the printer 230, or scanner 240.

Figure 3A:
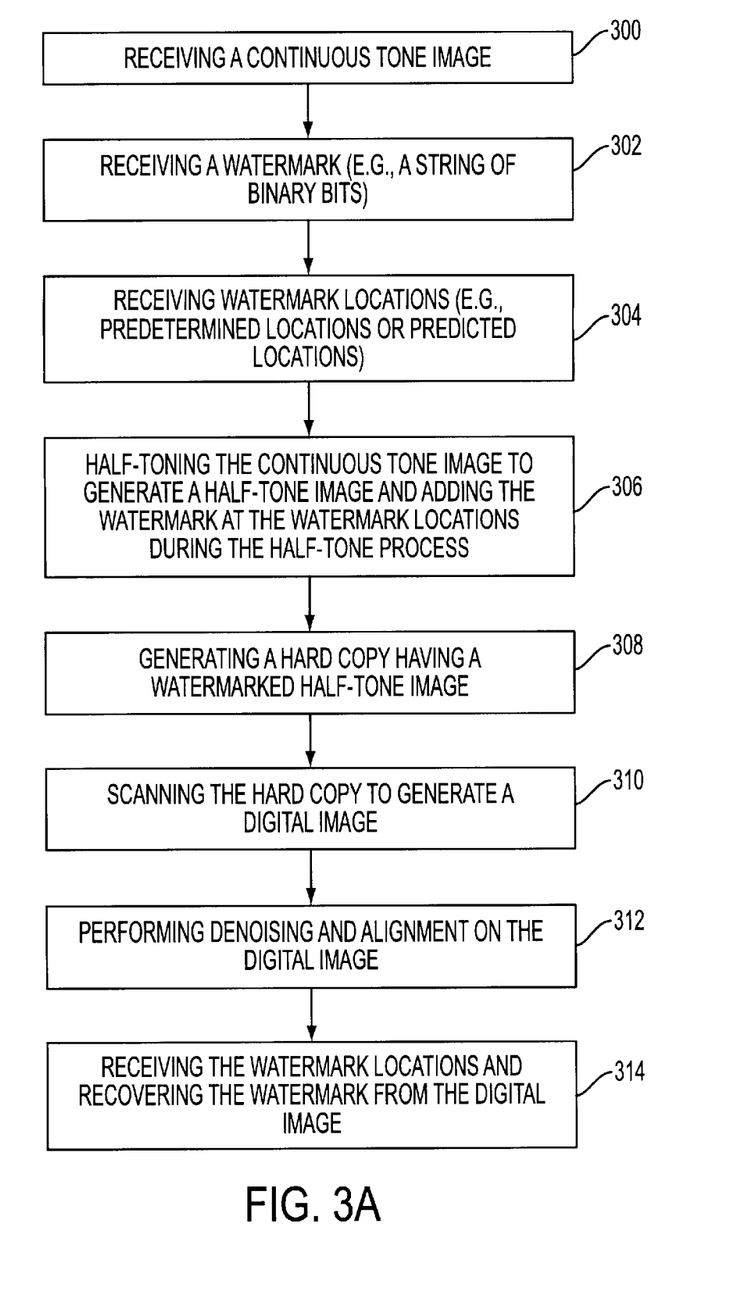
FIG. 3(a) is a flowchart illustrating the method of encoding and decoding a watermark according to one embodiment of the present invention.

FIG. 3(a) is a flowchart illustrating the watermarking method of the present invention in accordance with one embodiment of the present invention. In step 300, the watermarking module 44 receives the input image 40. The input image 40 can be provided by any image source (e.g., an image file stored in a memory). For example, the original image 40 can be an image that is generated by a digital camera and then stored in a memory, or it can be a data file or other file.

In step 302, the watermarking module 44 receives the watermark 42 (e.g., a string of binary bits). The watermark 42 can include any desired information (e.g., information specified by a system designer) in binary form. For example, watermark 42 can be information that reveals one or more identifying characteristics regarding the half-tone process through which the image is rendered. In one embodiment, the watermark 42 includes an identifier (e.g., a serial number) of a printer 230 which can be represented as a string of binary bits.

In step 304, the watermarking module 44 receives the watermark locations 43 that can be predetermined locations. Alternatively, watermark locations 43 can be location determination criteria (e.g., a description of a predictor of watermark locations that is based on previously determined halftone values). Thereafter, predicted locations, as described in greater detail hereinafter, can be generated based on the location determination criteria (e.g., prediction tables of previously determined halftone values). Several embodiments of the present invention that use predetermined locations are described in connection with FIGS. 5–7, and embodiments of the present invention that use predicted locations are described in further detail in connection with FIGS. 10–12.

In step 306, the watermarking module 44 performs halftoning on the input image 40 to generate a watermarked half-tone image 46. During this half-tone process, the watermarking module 44 embeds the watermark 42 at the watermark locations 43 of the half-tone image. The half-toning process can be either dithering half-toning, or error diffusion half-toning (as described in greater detail below in one embodiment).

In step 308, based on the watermarked half-tone image 46, the print engine 208 generates a hard copy 48 of the half-tone image with watermark 42 by printing it onto a sheet of paper, transparency or similar medium.

Assuming that it is now desired to identify the printer that generated the hard copy 48, in step 310, the hard copy 52 can be scanned by the scanner 240 or the all-in-one machine 204. The scanned image 25 is then provided to the watermark recovery program 54, which performs the alignment, de-noising and decoding or recovery steps described below.

In step 312, the WRM 54 performs alignment and de-noising on the scanned image 25. Alignment and de-noising are well known operations in the inverse half-toning process and can be accomplished by utilizing well-known techniques in the art. In step 314, the WRM 54 receives the watermark locations 43 and the scanned image 25 and based thereon recovers the watermark 42. The recovered watermark 42 can then be provided to a user for further analysis, such as analysis in connection with identifying the source of a hard copy (e.g., hard copy 52).

Figure 3B:
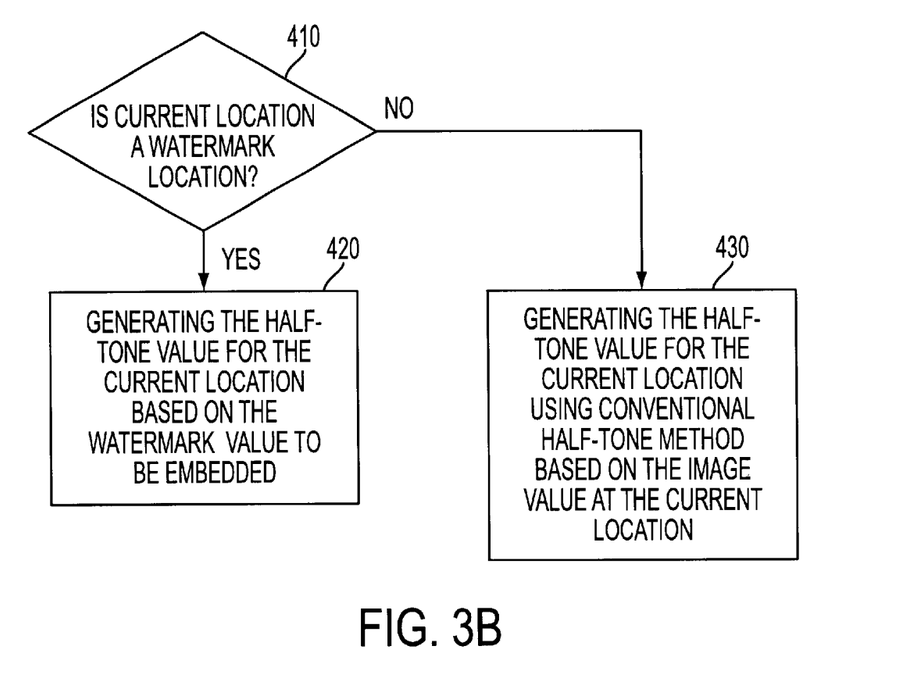
FIG. 3(b) is a flowchart illustrating in greater detail the step of adding a watermark during the half-toning process according to one embodiment of the present invention.

FIG. 3(b) is a flowchart that illustrates in greater detail the step of adding the watermark at the watermark locations during the half-toning process according to one embodiment of the present invention. In step 410, a determination is made whether a current pixel is a watermark location 43. If yes, in step 420, the half-tone value for the current location is based on the watermark value to be embedded. If no, in step 430, the half-tone value for the current location is generate based on conventional half-toning methods and based on the image value at the current location. Each pixel in the image is processed in a similar fashion. As will be discussed in greater detail herein below, some embodiments of the present invention generate the half-tone value for the current location based on the watermark value by utilizing a minimal intervention scheme so as to reduce distortion in the rendered image.

Distortion in the Watermarking Process

Distortion of the digital image is always a concern during the watermarking process since watermarking adds information that is unrelated to the image content to the digital image. For example, distortion occurs because certain pixels of the watermarked half-tone image 46 reflect watermark values instead of image values. In other words, certain pixels need to be "changed" in order to reflect watermark values and embed information into the image. The term "flip" or "flipping" means changing a pixel's value (i.e., 0 or 1) from the intended value (i.e., the half-tone value based on the image content) in the half-tone image 46 to an opposite value for purposes of adding the desired watermark into the half-tone image 46.

For example, if a pixel value at a particular location is supposed to be "0" in the half-tone image based on the image content, but a watermark value of "1" is required at that pixel location, then the value of "1" is be imposed at that location, thereby causing the value of "0" to be changed or flipped to a value of "1". As a result, distortion can be serious if a significant number of pixels need to be flipped in order to embed the watermark 42.

The amount of distortion can be determined through a hypothetical "perceived image" PG, which is an image that could have caused the new halftone pattern. Assuming that the input image 40 is designated as G, then the distortion is the root mean square (rms) of the difference between PG and G. This difference (PG−G) is a "salt and pepper" type of noise (i.e., the difference is zero anywhere except the flip locations, and potentially near them) rather than the classic "white noise", so the total square error is normalized by the number of flips, rather than by the total number of pixels in the input image 40. Thus, the distortion measure is the standard deviation of the additive noise at the flip locations. Note that PG is not unique. In other words, given the distorted halftone image, there are several different candidates for PG. The distortion measure is then defined to be the minimal distortion over all the possible PGs. PG and consequently the halftone distortion measure depend on the half-toning process. The present invention utilizes several techniques that are described herein below to minimize the distortion introduced into the image during watermarking by selecting the locations for imposing watermark values in such a way as to reduce the standard deviation of rate-distortion at the flip locations in the image.

Watermarking In the Error Diffusion Half-Tone Process

Figure 4:
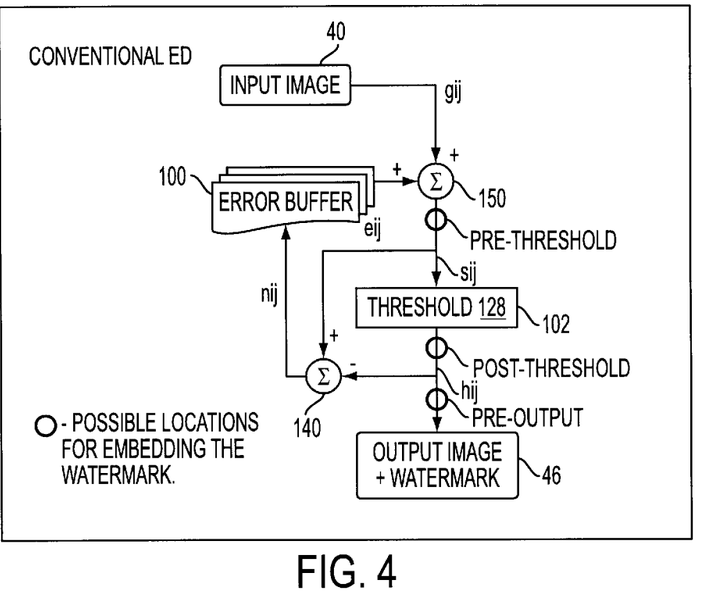
FIG. 4 illustrates the general steps that are implemented for a conventional error diffusion half-toning scheme.

In one embodiment of the watermarking method according to the present invention, the watermark 42 is added or embedded during an error diffusion half-toning process. FIG. 4 illustrates the basic principles of conventional error diffusion half-tone process. Continuous-tone information (e.g., gray level values) from the input image 40 (e.g., a continuous tone image) is represented by the notation $g_{ij}$, and flows sequentially in raster scan order from a source (e.g., the PC 200) to the error diffusion module that can, for example, reside in the printer 230 or in the all-in-one machine 204. A corresponding error value denoted by $e_{ij}$ is added to the continuous tone value by an adder 150 to provide a desired value denoted by $s_{ij}$, which represents the value that is desired for the ij location. The error value $e_{ij}$ is incurred by previous halftone pixel values and is stored in an error buffer 100 located in the printer 22.

At this point, the desired value $s_{ij}$ is provided to a comparator 102 where it is compared with a predetermined threshold. Since only halftone values (0 or 255) are possible, the predetermined threshold is usually selected to be 128. As a result, the output of the comparator 102 (denoted by $h_{ij}$) will be:

| | |
|---|---|
| $h_{ij} = 255$ | if $s_{ij} \geq 128$ |
| $h_{ij} = 0$ | if $s_{ij} < 128$ |

Here, $h_{ij}$ is the halftone value for the location ij.

Figure 8:
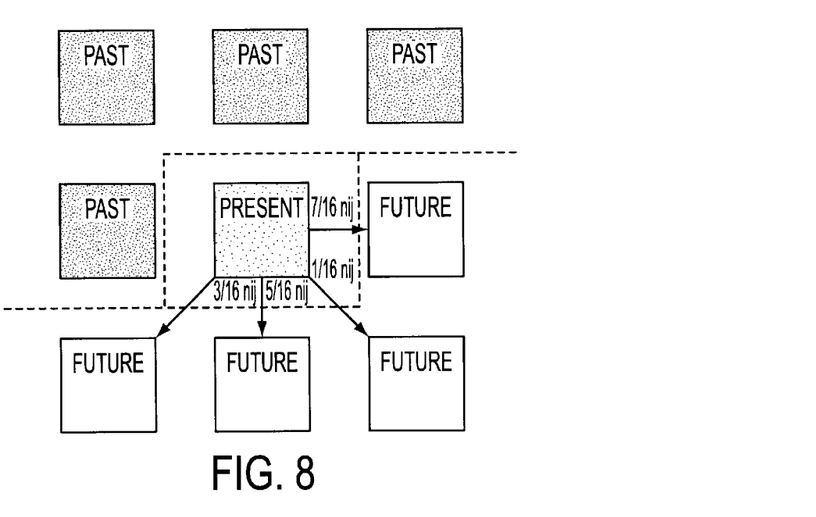
FIG. 8 illustrates a diffusion filter that can be used for diffusing error $n_{ij}$ to future pixels.

The new error $n_{ij}$ is determined by: $n_{ij}=s_{ij}-h_{ij}$, at an adder 140, as illustrated in FIG. 4. The new error $n_{ij}$ is diffused to future incoming pixels (i.e., neighboring pixels that have yet to be half-toned) by providing it to the error buffer 100. One possible diffusion method can be implemented by a diffusion filter described by R. Floyd and L. Steinberg in "An adaptive algorithm for spatial gray scale", *SID Symposium*, pages 36–37, 1975, whose disclosures are incorporated by this reference as though fully set forth herein. Referring to FIG. 8, Floyd and Steinberg's diffusion filter is related to a conventional raster scan, where 7/16 of $n_{ij}$ is diffused forwards, ¹⁄₁₆ of $n_{ij}$ is diffused to the location one pixel ahead in the next line, ⁵⁄₁₆ of $n_{ij}$ is diffused to the same location in the next line, and ³⁄₁₆ of $n_{ij}$ is diffused to one position rearwardly in the next line.

Referring back to FIG. 4, the present invention provides three possible locations where the watermark 42 can be introduced. These three locations are labeled as "Pre-Output", "Post-Threshold", and "Pre-Threshold", and each technique is described in greater detail in connection with FIGS. 5–7, respectively.

Pre-Output Watermarking Scheme

Figure 5:
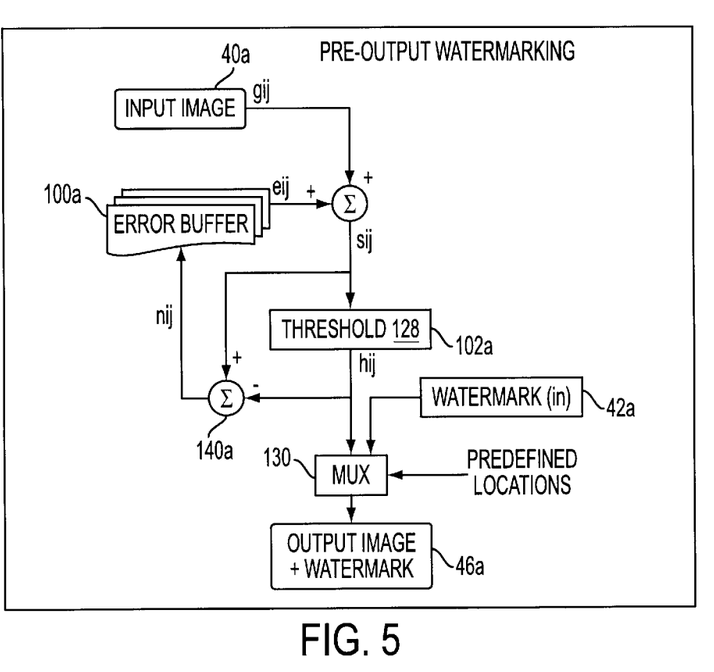
FIG. 5 illustrates a method for watermarking in an error diffusion scheme.

Referring now to FIG. 5, a "Pre-Output" watermarking technique according to the present invention is illustrated. The same numerals are used in FIG. 5 for the same elements set forth in FIG. 4, except that an "a" has been added to the numeral designations in FIG. 5. In the pre-output watermarking technique, the pixels of the watermark 42a are imposed by simply replacing the halftone pixel $h_{ij}$ at the predetermined locations by the next watermark pixel bit $w_k$ just prior to outputting the half-tone image. It is noted that the imposed watermark values are not provided to adder 140a.

A multiplexer 130 can be positioned with a first input coupled to the output of the comparator 102a, and a second input coupled to the watermark 42a. The multiplexer 130 has a third input that receives signals indicating the predetermined locations where the watermark values are to be imposed on the halftone pixel $h_{ij}$. Thus, in the pre-output watermarking scheme of FIG. 5, the new error $n_{ij}$ is not affected by the watermark pixels $w_k$.

The watermark locations 43 can be predetermined locations, as shown, or a description (e.g., a table) of a predictor for generating watermark locations. The predetermined locations can be evenly spaced locations as shown in FIG. 9b or random locations. The predetermined locations are "predetermined" in the sense that once determined, these locations are the same for all images (i.e., the locations are not image dependent). On the other hand, "predicted" watermark locations are calculated based on look-up tables and are dependent on the image (e.g., the previously rendered pixels that neighbor the current pixel). In this regard, the predicted locations can be different for different images and are calculated based on the look-up tables for each different image as the image is being rendered. However, given the same image and look-up tables, the present invention generates the same predicted watermark locations. The method for generating the look-up tables and generating the predicted locations based on the look-up table are described in greater detail hereinafter. Similarly, for the embodiments shown in FIGS. 6 and 7, watermark locations 43 can be predetermined watermark locations or a description (e.g., a table) of a predictor of watermark locations.

Post-Threshold Watermarking Scheme

Figure 6:
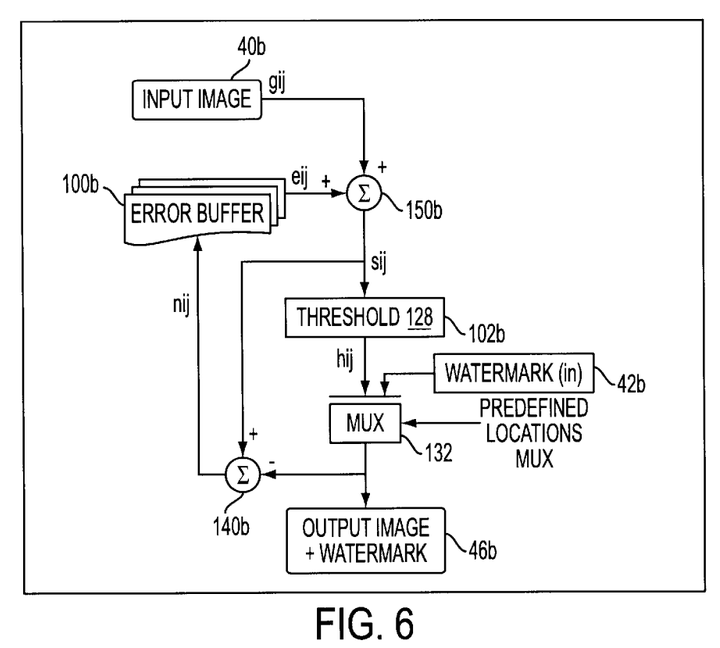
FIG. 6 illustrates a method for watermarking in an error diffusion scheme according to one embodiment of the present invention.

Referring now to FIG. 6, a "post-threshold" watermarking technique according to the present invention is illustrated. The same numerals are used in FIG. 6 for the same elements set forth in FIG. 4, except that a "b" has been added to the numeral designations in FIG. 6. In the post-threshold watermarking technique, the pixels of the watermark 42b are imposed on the pixel values $h_{ij}$ that emerge from the comparator 102b, and the changed values of $h_{ij}$ are re-routed as part of the new error $n_{ij}$. In other words, the watermark 42b is imposed by replacing the halftone pixel $h_{ij}$ at the predetermined locations by the next watermark pixel bit $w_k$, but the watermarking will be accounted for when determining the new error $n_{ij}$.

A multiplexer 132 can be positioned with a first input coupled to the output of the comparator 102b, and a second input coupled to the watermark 42b, and with its output coupled to the adder 140b that determines the new error $n_{ij}$. The multiplexer 132 has a third input that receives signals indicating the predetermined locations where the halftone pixel $h_{ij}$ is to be imposed. Thus, in the post-threshold watermarking scheme of FIG. 6, the error diffusion mechanism can be used to hide the watermark 42b by modifying the future halftone patterns. In other words, the resulting error caused by the imposing of the watermark bit is diffused.

Pre-Threshold Watermarking Scheme

Figure 7:
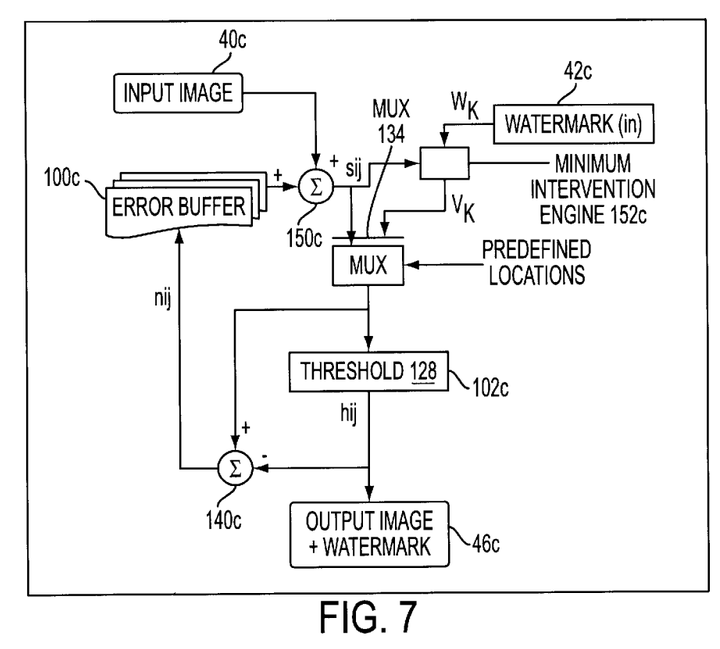
FIG. 7 illustrates a method for watermarking within an error diffusion scheme according another embodiment of the present invention.

Referring now to FIG. 7, a "pre-threshold" watermarking technique according to the present invention is illustrated. The same numerals are used in FIG. 7 for the same elements set forth in FIG. 4, except that a "c" has been added to the numeral designations in FIG. 7. In the pre-threshold watermarking technique, the watermark 42c is introduced to the desired value $s_{ij}$ prior to thresholding. In particular, the watermark 42c is embedded by imposing the desired value $s_{ij}$ at the predetermined locations with minimal intervention values $v_k$. The minimal intervention values $v_k$ are as follows:

| | |
|---|---|
| (when there is consensus) | $v_k = s_{ij}$ |
| (no consensus and $w_k = 255$) | $v_k = 128$; and |
| (no consensus and $w_k = 0$) | $v_k = 127$; | where "consensus" means that $s_{ij}$ will produce $w_k$ after thresholding. In other words, no need for intervention. If there is no consensus between $w_k$ and the expected threshold of $s_{ij}$, and if the desired watermark pixel bit $w_k$ is 255, $v_k$ is set to equal 128 which is the smallest value needed to produce a pixel value after thresholding of 255. For example, if $s_{ij}$ is 50, then the value of $v_k$ is changed to 128 in order to generate a pixel value of 255. Similarly, if there is no consensus between $w_k$ and the expected threshold of $s_{ij}$, and if desired watermark pixel bit $w_k$ is 0, then $v_k$ is set to equal 127 which is the largest value acceptable to produce a pixel value after thresholding of 0. For example, if $s_{ij}$ is 130, then the value of $v_k$ is changed to equal 127 in order to generate a pixel value of 0. Thus, these examples illustrate the meaning of the term "minimal intervention", where the Pre Watermarking technique attempts to intervene in as minimal a degree as possible with the values of $s_{ij}$ by assigning the smallest or largest value possible to produce the desired watermark value.

Continuing to refer to FIG. 7, a multiplexer 134 can be positioned with a first input coupled to the output of the adder 150c, a second input coupled to the watermark 42c through a minimal intervention engine 152c, and with its output coupled to both the comparator 102c and the adder 140c that determines the new error $n_{ij}$. The multiplexer 134 has a third input that receives signals indicating the predetermined locations where the watermark values are to be imposed.

A comparison of the amount of distortion that can result from each of the watermarking techniques is illustrated in FIGS. 5–7. For the Pre Watermarking technique of FIG. 7, the watermark embedding is accomplished with minimal intervention, so that the distortion may be attributed to the present location with no diffusion artifacts. The distortion at each location (i,j) is denoted $d_{ij}$, and can be shown to be $d_{ij}=|s_{ij}-128|$.

Figure 9A:
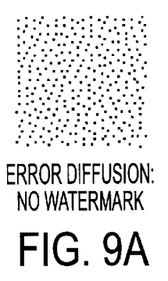
FIGS. 9(a)–9(e) illustrate a hard copy output of the various watermarking techniques of FIGS. 5–7 for a particular image.
Figure 9B:
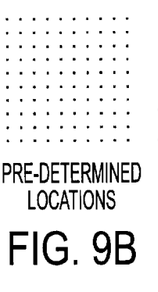
Figure 9C:
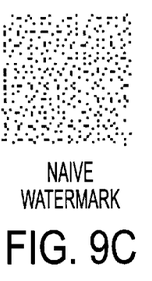
Figure 9D:
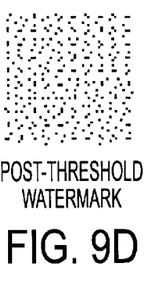
Figure 9E:
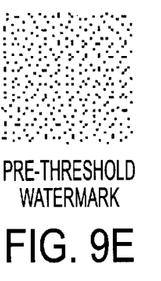

In this regard, FIGS. 9(a)–9(e) illustrate examples of watermarked half-tone images rendered using the techniques of FIGS. 5–7. FIG. 9(a) is a half-toned image that does not include a watermark. The predetermined watermark locations are illustrated in FIG. 9(b). FIGS. 9(c)–9(e) illustrate the halftone image of FIG. 9(a) after embedding the watermark information at the locations depicted in FIG. 9(b) using the pre-output (naïve) post-threshold and pre-threshold watermarking techniques, respectively. By comparing FIGS. 9(c)–9(e), it can be seen that the post-threshold and pre-threshold watermarking techniques produce better results (i.e., a half-tone image that is closest to the intended half-tone image).

Since the human visual system cuts off high frequency noise but is sensitive to low frequency noise, the images generated by the pre-threshold watermarking technique of the present invention has the least amount of low-frequency noise. For example, low frequency noise in the form of clusters of white or black dots or strings of black pixels and strings of white spaces, is very evident in FIG. 9(c), less evident in FIG. 9(d), and even less evident to a viewer in FIG. 9(e). One reason for the better quality in FIG. 9(e) is that the error of pre-threshold watermarking is predominantly high frequency, thereby reducing visible noticeability, especially in a half-tone image.

Predicted Locations

As illustrated above, it is important to minimize the amount of distortion in any watermarking technique. The measure of distortion can be symbolized by $d_{ij}$. Thus, in one embodiment of the present invention, a predictor 154 is provided to select pixel locations for watermarking that minimizes $d_{ij}$. Since it is not realistic for the watermark pixel locations to be communicated to the decoder, some other indicators of the locations of the watermark should be available to the decoder.

In order to maintain the watermark integrity, and since $d_{ij}$ cannot accurately predicted in the decoder, the watermarking module 44 can employ an estimator or predictor 154 to determine the locations, where the watermark can be imposed, that minimizes distortion ($d_{ij}$). In this embodiment, the predictor 154 can reside in both the watermarking module 44 and the WRM 54.

Figure 10:
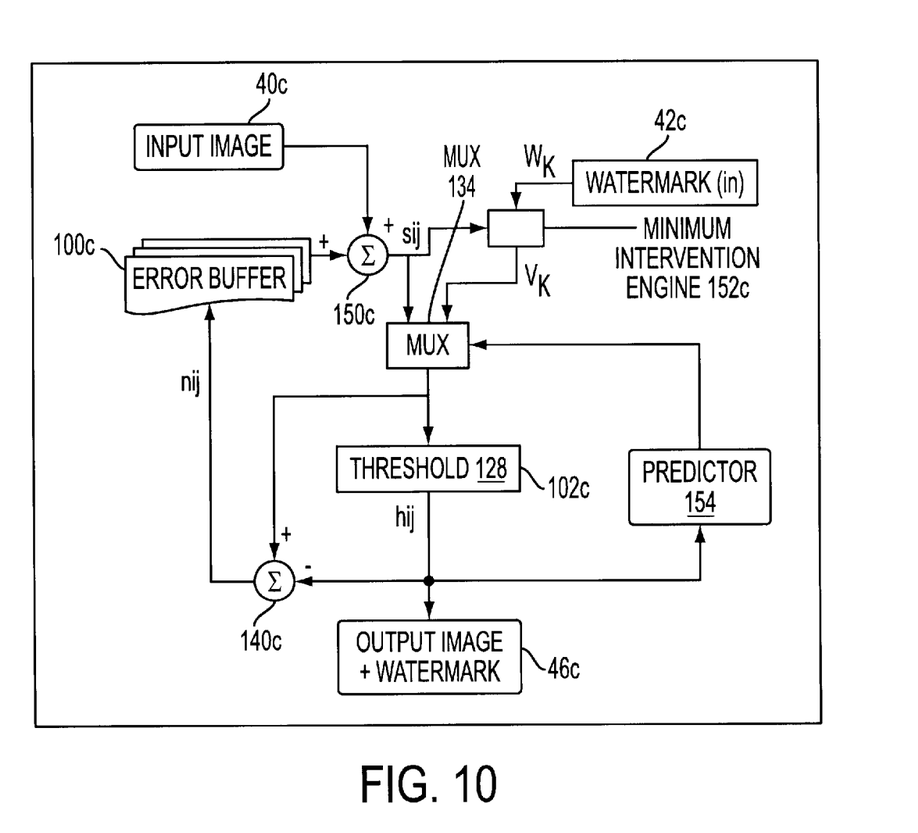
FIG. 10 illustrates the use of watermark location predictor according to an embodiment of the present invention.

In this embodiment, the technique illustrated in FIG. 7 can be modified to arrive at that shown in FIG. 10, where instead of the third input of the multiplexer 134 receiving signals that indicate the predetermined locations where the watermark is to be imposed, the third input is coupled to an estimator or predictor module 154 to receive predicted watermark locations. In addition, the $h_{ij}$ output from the comparator 102c is also looped to an input of the predictor 154 to provide the output image to predictor module 154. Thus, the predictor module 154 generates the predicted locations where the watermark values are to be imposed.

As discussed earlier, these predicted values are dependent on the image content of the previously rendered pixel values. In other words, the data that the predictor 154 can use is usually limited to the data available in the decoder at the given stage which is the causal halftone image. Here, the term "causal" refers to the pixels that were previously processed or rendered. Therefore, the $d_{ij}$'s should be estimated from the causal halftone pattern.

First, a look-up table is generated off-line based on a database of natural images. The look-up table can have two columns: one column for listing the different patterns of the causal neighborhood, and a second column for listing the distortion measure. Alternatively, the look-up table can include a single column of causal neighborhoods that have a distortion measure below a predetermined distortion level. For example, during the design process the top 10 or 20 patterns having the least amount of distortion can be selected to form the look-up table depending on the number of bits of information to be embedded into the image. Second, the look-up table is utilized to generate predicted locations for inserting watermark values based on a predetermined causal neighborhood (e.g., a neighborhood of 21 previously rendered pixels). For example, when determining whether to insert a watermark at the current location, the predictor module 154 receives previously rendered pixels (e.g., a neighborhood of 21 previously rendered pixels), compares these pixels to patterns in the look-up table, and based on this comparison determines if the current locations is a watermark location. Each pixel location is evaluated by consulting the look-up table in a similar fashion.

Since images are usually locally constant, the average of the causal halftone neighborhood of a pixel should give the predictor 154 a good approximation of the local values (e.g., local gray level values) in the original image 40. Using this information, the predictor 154 can emulate the half-toning algorithm and estimate $d_{ij}$.

Figure 11A:
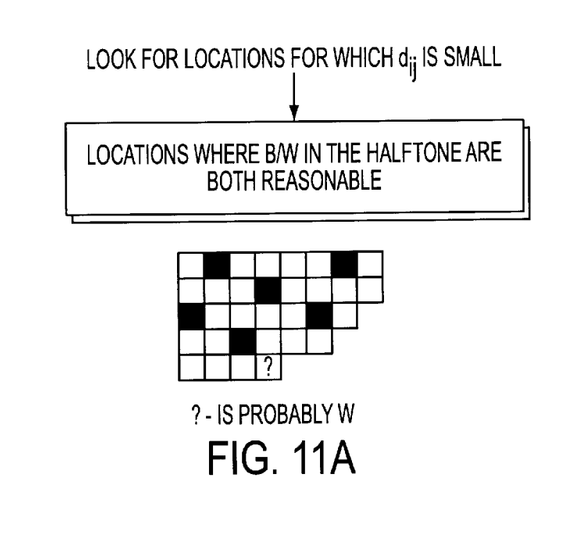
FIGS. 11(a) and 11(b) illustrate pixels in causal neighborhoods indicating large and small amounts of distortion, respectively.

This process can be illustrated in connection with the example of FIGS. 11(a) and 11(b). FIG. 11(a) illustrates a first causal half-tone neighborhood and a current pixel (marked by "?"). The decoder has to decide whether $d_{ij}$ is large or small. Consider that a low $d_{ij}$ means that both the black and white halftones are reasonable possibilities for $h_{ij}$. Therefore, for FIG. 11(a), a black halftone is not a reasonable possibility at that location, so the predictor 154 should indicate that $d_{ij}$ is large.

Figure 11B:
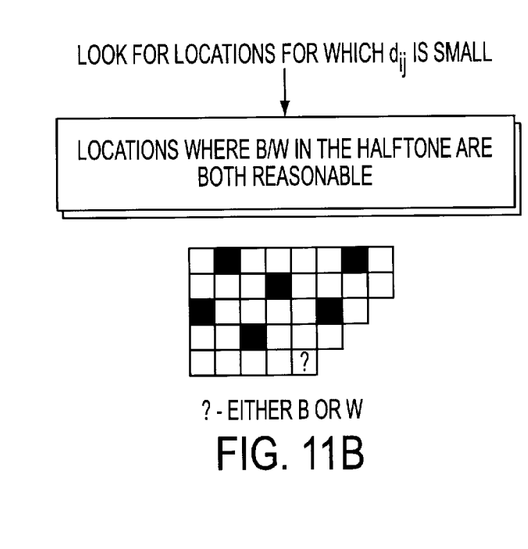

On the other hand, in FIG. 11(b), both black and white halftones seem to be reasonable possibilities for the location, and so in this case, the predictor 154 should indicate that $d_{ij}$ is small, and that this location is suitable for imposing a watermark value. This example does not constitute a real estimator or predictor of $d_{ij}$, nor is such an estimator necessary. All that is needed is an estimation of whether $d_{ij}$ is smaller than a predefined threshold value which determines the distortion. Since it is time-consuming to operate a predictor on-line, it may be preferable to perform the estimation off-line and generate a look-up table that lists all the neighborhoods which estimate a small $d_{ij}$.

A causal estimator of low $d_{ij}$ values is provided which allows for consistent determination of watermark embedding locations in both the encoder and the decoder. Its derivation is based on statistics obtained from a database of natural images. The estimation can be performed off-line in the following manner.

Natural images can be represented by a set of 249 images of constant gray level {4,5, . . . 251 } with additive independent noise distributed uniformly in the range {−4,4}. The size of all images can be 500×500. This set of images are half-toned without any watermark. The resulting "natural halftones" are then analyzed to find a set of predominant neighborhoods (e.g., neighborhoods with more than 50 occurrences). Then, the sample average of $d_{ij}$ is calculated for each predominant neighborhood. Each value for each predominant neighborhood represents the expected average square distortion incurred if the corresponding neighborhood is added to the estimator's lookup table. Finally, the predominant neighborhoods are ordered on a list in an increasing order of distortion.

Partial lists taken off the top of this list are used for estimator lookup tables. More entries in the lookup table correspond to higher rate and higher distortion. Here, the term "rate" means the number of watermark pixels divided by the total number of pixels in the original image 40.

Figure 12:
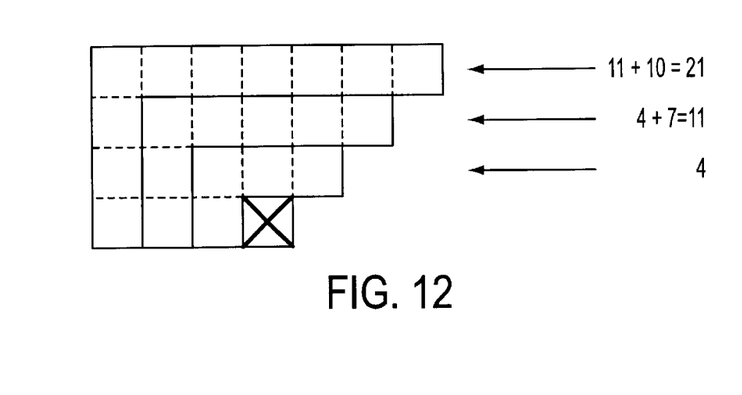
FIG. 12 illustrates three neighborhoods of different sizes that can be selected for use in the causal predictor module of one embodiment of the present invention.

The above steps can be performed for different neighborhood sizes, such as neighborhood sizes of 4, 11 and 21. These neighborhoods are depicted in FIG. 12, and each neighborhood is causally nested within each other.

EXAMPLES

Figure 13A:
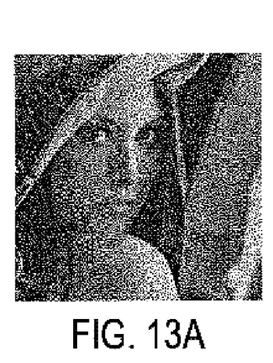
FIGS. 13(a)–13(c) illustrate exemplary watermarked half-tone images having different watermark rates and rendered according to the present invention.
Figure 13B:
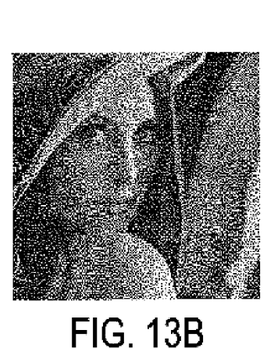
Figure 13C:
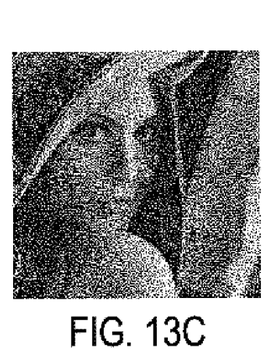

FIG. 13(*a*) presents part of a Lena image half-toned without a watermark. FIG. 13(*b*) presents the same image with a watermark rate of 0.01 (i.e., one bit for every 100 pixels), and FIG. 13(*c*) presents the same image with a watermark rate of 0.142 (i.e., about one bit for every 7 pixels).

In FIG. 13(*b*), the watermark encoder uses an estimator lookup table of 1,500 entries, and embeds 2,729 bits of watermark information (i.e., about one bit for every 96.1 pixels), for a rate of about 0.01. The standard deviation $d_{ij}$ at the 1,388 flip locations is 25.7 gray levels, which represents a distortion of 0.101 in the normalized scale.

In FIG. 13(*c*), the watermark encoder uses an estimator lookup table of 13,500 entries, and embeds 37,299 bits of watermark information (i.e., about one bit for every 7 pixels), for a rate of about 0.142. The standard deviation $d_{ij}$ at the 18,503 flip locations was 37.4 gray levels, which represents a distortion of 0.147 in the normalized scale. It is noted that the distortion between FIGS. 13(*a*) and 13(*b*) is practically imperceptible, whereas the distortion in FIG. 13(*c*) is more visible.

Figure 14A:
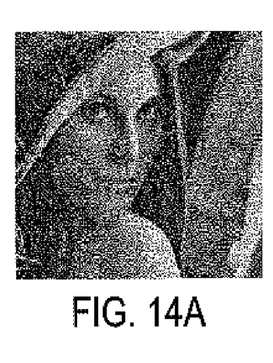
FIGS. 14(a)–14(c) illustrate more exemplary watermarked half-tone images having different watermark locations and rendered according to the present invention.
Figure 14B:
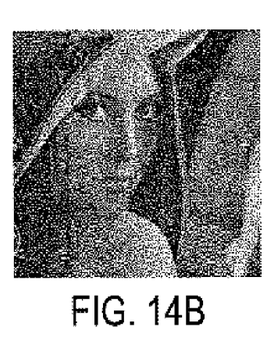
Figure 14C:
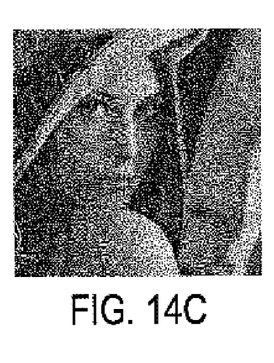

Further insight may be obtained by comparing the watermarked halftones in FIGS. 14(*a*)–14(*c*). All three images have a watermark rate of 0.04 (i.e., one bit for every 25 pixels). In FIG. 14(*a*), the watermark is embedded by the proposed estimator (size 21). In FIG. 14(*b*), the watermark is embedded in (blue-noise) evenly distributed predefined locations. In FIG. 14(*c*), the locations were chosen randomly. The distortion rates are 0.110, 0.200 and 0.204 for FIGS. 14(*a*)–14(*c*), respectively.

It should also be noted that while the distortion in FIG. 14(*a*) gives the impression of an additive white noise, the salt and pepper artifacts of the distortion are more visible in FIGS. 14(*b*) and 14(*c*), because of the occasional bad locations chosen by embedding methods that do not use estimators.

The method of watermarking during the halftone process of the present invention is important in many applications where digital security and identification are desired. A first application related to digital security is to use the present invention to watermark prints in order to authenticate that print or document. A second application related to identification is to use the present invention to identify the printer that produced a particular print or document.

A third application uses the method of watermarking of the present invention for copyright enforcement and for fraud detection. In this application, the method of recovering the watermark of the present invention is utilized to identify the source of the print. For example, the present invention can be used to scan in the print, and based oh the scan of the print to quickly retrieve and provide an identifier of the offending printer for subsequent prosecution. The method of watermarking of present invention can be applied to other applications that include, but are not limited to, tracing of illegal image documents, embedding digital signatures for authentication purposes, authenticating picture identification cards, and the attribution of functionality to paper.

The present invention provides a watermarking method and system for use during a halftone process that can be utilized to uniquely identify a rendering process or rendering device that that printed a particular hard copy.

One advantage of the present invention is that the watermark is not easily noticeable and not easily removed from the halftone image. Another advantage is that the present invention adds a watermark to a half-tone image while minimizes the degradation of the resulting half-tone image. In addition, the present invention provides watermarks that are robust to printing and scanning.

Although the present invention has been described in connection with a printer that employs a half tone process for printing hard copies, the teachings of the present invention can be applied to other applications. For example, displays (e.g., those used with personal digital assistants (PDAs) with space and size limits may use a half-tone process for displaying information. These displays can incorporate the present invention to embed and recover watermarks from images displayed on these displays. It is noted that the teachings of the present invention can be utilized in any device or application that employs a half tone process to generate a half-tone image and that has a need to include a watermark in that half-tone image.

While the description above refers to particular embodiments of the present invention, it will be understood that many modifications may be made without departing from the scope thereof. The accompanying claims are intended to cover such modifications as would fall within the true scope of the present invention.

What is claimed is:

1. A method of generating a watermarked half-tone image from a continuous-tone image, the method comprising:

performing error diffusion half-toning on the continuous-tone image; and adding a watermark to the half-tone image during the half-toning;

wherein error caused by adding the watermark is diffused into the half-tone image; and wherein the error diffusion-halftoning includes adding information regarding the continuous-tone image to the error to obtain a desired value selecting one of the desired value and a watermark value as a pre-threshold value based on a watermark location; and generating a halftone value based on a relationship between the pre-threshold value and a threshold.

2. The method of claim 1, wherein adding the watermark includes:

receiving predetermined watermark locations; and imposing the watermark at the watermark locations.

3. The method of claim 2, wherein the predetermined watermark locations are one of random locations and evenly spaced locations.

4. The method of claim 1, further comprising determining a location for the watermark in the half-tone image during the half-toning based on prediction tables and a neighborhood of previously rendered pixels in the half-tone image as the half-tone image is being rendered.

5. The method of claim 1, wherein selecting one of the desired value and the watermark value as the pre-threshold value based on the watermark location includes:

providing a watermark value wherein the watermark value is a minimal intervention value which after thresholding generates a desired half-tone value.

6. A computer readable medium for a processor, the medium storing a program for causing the processor to perform the method of claim 1.

7. A watermarking system for generating a watermarked halftone image from a continuous tone image, the system comprising:

a watermarking module for performing error diffusion halftoning on the continuous tone image, and adding a watermark to the halftone image during the half-toning, the error diffusion half-toning including generating a desired value by adding information from the continuous tone image to an error value, and selecting one of the desired value and a watermark value as a pre-threshold value based on a watermark location;

wherein error caused by adding the watermark is diffused into the halftone image.

8. The watermarking system of claim 7 further comprising:

a watermark recovery module including a first input for receiving a scanned image and a second input for receiving the watermark locations, and based thereon for recovering the watermark.

9. The watermarking system of claim 8 further comprising:

a scan engine coupled to the watermark recovery module for receiving a hard copy of a watermarked half-tone image, generating a scanned version of the watermarked half-tone image, and providing the scanned version to the watermark recovery module.

10. The watermarking system of claim 7 further comprising:

a print engine coupled to the watermarking module for receiving the watermarked half-tone image and based thereon for generating a hard copy of the watermarked half-tone image.

11. The system of claim 7, wherein the watermark value is a minimal intervention value.

12. The system of claim 7, further comprising determining a location for the watermark in the halftone image, by comparing predetermined neighborhood patterns to causal neighborhoods of a current pixel location as the halftone image is being rendered; and selecting the location of a causal neighborhood that matches one of the predetermined patterns.

13. A watermarking system comprising a watermarking module including a first input for receiving a continuous tone image, a second input for receiving a watermark, and a third input for receiving watermark locations, the watermarking module for generating a half-tone image with the watermark imposed at the watermark locations in the half-tone image, the watermarking module including:

a minimal intervention module coupled to receive the watermark and based thereon for generating a minimal intervention pre-threshold value; and a threshold module coupled to the minimal intervention module for receiving the minimal intervention pre-threshold value and for generating a desired half-tone value based on the watermark.

* * * * *